United States Patent [19]
Lee

[11] Patent Number: 5,724,192
[45] Date of Patent: Mar. 3, 1998

[54] WIDE-ANGLE ZOOM LENS

[75] Inventor: Hae-Jin Lee, Changwon-si, Rep. of Korea

[73] Assignee: Samsung Aerospace Industries, Ltd., Kyeongsangnam-do, Rep. of Korea

[21] Appl. No.: 533,432

[22] Filed: Sep. 25, 1995

[30] Foreign Application Priority Data

Sep. 26, 1994 [KR] Rep. of Korea ............... 94-24144
Sep. 18, 1995 [KR] Rep. of Korea ............... 95-30457

[51] Int. Cl.⁶ ................................................ G02B 15/14
[52] U.S. Cl. ................................................ 359/689; 359/683
[58] Field of Search ............................ 359/689, 686, 359/682, 681, 791, 683

[56] References Cited

U.S. PATENT DOCUMENTS

| | | | |
|---|---|---|---|
| 5,315,439 | 5/1994 | Ito | 359/689 |
| 5,528,429 | 6/1996 | Hagimori | 359/689 |
| 5,530,593 | 6/1996 | Shibayama et al. | 359/689 |
| 5,566,026 | 10/1996 | Yoon | 359/689 |

FOREIGN PATENT DOCUMENTS

| | | |
|---|---|---|
| 63-16142 | 1/1988 | Japan . |
| 4-97112 | 3/1992 | Japan . |
| 4-165319 | 6/1992 | Japan . |
| 5-19166 | 1/1993 | Japan . |
| 6-273669 | 9/1994 | Japan ............... 359/689 |
| 2260201-A | 4/1993 | United Kingdom ............... 359/689 |

*Primary Examiner*—David C. Nelms
*Assistant Examiner*—Jordan M. Schwartz
*Attorney, Agent, or Firm*—Finnegan, Henderson, Farabow, Garrett & Dunner, L.L.P.

[57] ABSTRACT

A wide-angle zoom lens system which can reduce variation in aberrations and obtain a sufficient back focus distance at the wide angle position by making the view angle wide at the wide angle position and making the whole length of the optical system short at the telephoto position. The wide-angle zoom lens system, includes a first lens group having a positive refractive power; a second lens group having a positive refractive power; and a third lens group having a negative refractive power, the distances between the first lens group, the second lens group, and the third lens group change during zooming, wherein the first lens group includes a first lens having a negative refractive power with a shape of a meniscus lens concave toward an object, a second lens having a positive refractive power and a third lens having a negative refractive power, the first, second and third lens groups are made of spherical lenses, the distance between the first and second lens groups is increased, and the distance between the second and third lens groups is reduced; and wherein the zoom lens system has the following characteristics: $-0.5 < (R_{1a1} + R_{1a2}) / (R_{1a1} - R_{1a2}) < -2.0$ wherein $R_{1a1}$ is a curvature radius toward the object of a lath lens in the first lens group, and $R_{1a2}$ is the curvature radius toward the image plane of the lath lens in the first lens group.

5 Claims, 10 Drawing Sheets

FIG. 6 (DISTORTION)

FIG. 5 (ASTIGMATISM)

FIG. 4 (SPHERICAL ABERRATION)

FIG. 9 (DISTORTION)

FIG. 8 (ASTIGMATISM)

FIG. 7 (SPHERICAL ABERRATION)

FIG. 12 (DISTORTION)

FIG. 11 (ASTIGMATISM)

FIG. 10 (SPHERICAL ABERRATION)

FIG. 15 (DISTORTION)

FIG. 14 (ASTIGMATISM)

FIG. 13 (SPHERICAL ABERRATION)

FIG. 18 (DISTORTION)

FIG. 17 (ASTIGMATISM)

FIG. 16 (SPHERICAL ABERRATION)

FIG. 21 (DISTORTION)

FIG. 20 (ASTIGMATISM)

FIG. 19 (SPHERICAL ABERRATION)

FIG. 24 (DISTORTION)

FIG. 23 (ASTIGMATISM)

FIG. 22 (SPHERICAL ABERRATION)

FIG. 27 (DISTORTION)

FIG. 26 (ASTIGMATISM)

FIG. 25 (SPHERICAL ABERRATION)

WIDE-ANGLE ZOOM LENS

BACKGROUND OF THE INVENTION

1. Field of the Invention

The present invention relates to a wide-angle zoom lens system designed for a lens shutter camera and more particularly, to a wide-angle zoom lens having three lens groups. The wide-angle zoom lens has a zoom ratio of more than 2.5 times while maintaining a wide angle at a wide angle position.

2. Description of the Prior Art

A normal focal length lens has a focal length approximately equal to the diagonal length of the recorded image. Thus, in still picture photograph, a 50 millimeter (mm) lens is generally considered a normal lens for 35 mm film which has a negative diagonal of approximately 42 mm. A wide angle lens has a focal length less than a normal lens, while a long or telephoto lens has a focal length greater than a normal lens.

In a zoom lens system, the overall focal length is adjustable with the widest angle of view at the shortest focal length and the narrowest angle of view at the longest focal length.

Recently lens shutter cameras have become compact and automated. Lens shutter cameras are also more likely to use a wide-angle zoom lens. The lens shutter cameras must be compact, light, and inexpensive, especially because they are often used by nonprofessionals.

As the lens shutter cameras become more compact, the zoom lens must also become more compact. Recently, lenses with a wide angle of view have become popular as well as panoramic cameras. A panoramic photograph is taken at a large view angle in a horizontal direction.

Japanese Patent Unexamined Publication Nos. Sho 63-16142 and Hei 5-19166, both entitled "Wide-Angle Zoom Lens," disclose zoom lenses with a first lens group having a positive refractive power and a second lens group having a negative refractive power toward an object.

On the other hand, Japanese Patent Unexamined Publication No. Hei 4-165319 discloses a zoom lens with a first lens group having a positive refractive power, a second lens group having a positive refractive power, and a third lens group having a negative refractive power toward an object. Also, Japanese Patent Unexamined Publication No. Hei 4-97112 discloses a zoom lens with of a first lens group having a negative refractive power, a second lens group having a positive refractive power, and a third lens group having a negative refractive power toward an object.

In the above-identified zoom lenses having two lens groups, a magnification change of the second lens group becomes large when a zoom ratio is increased by three times. The large change in the magnification of the second lens group greatly increases the variation in aberrations during zooming. Thus, compensating for aberrations becomes very difficult.

It is possible to obtain a long back focus length at a wide angle position because it is easy to construct a retrofocus type lens at the wide angle position in the zoom lens composed of the first lens group having the negative refractive power, the second lens group having the positive refractive power, and the third lens group having the negative refractive power toward the object. On the other hand, it is disadvantageous to make the entire length of the optical system long because it is difficult to construct a telephoto lens type system at a telephoto position.

It is difficult to construct the retrofocus type lens having a long back focal length at the wide angle position in the zoom lens composed of the first lens group having the positive refractive power, the second lens group having the positive refractive power, and the third lens group having the negative refractive power toward the object. In addition, it is difficult to obtain a sufficient back focus distance for mounting a panoramic photographic system at the wide angle position because the distance between the second lens group and the third lens group at the wide angle position is increased. It is also difficult to compensate aberrations beyond an optical axis caused when light passing through the second lens group passes through a higher position than the optical axis of the third lens group.

However, the retrofocus type lens having the long back focus distance can be constructed as a combined focal length of the first lens group becomes the focal length having the positive refractive power by using a lens with two concave sides and having a short focal length with a negative refractive power in the above-identified zoom lens having three lenses groups.

As described above, the shorter the focal length of the lens having the negative refractive power in the first lens group, the more advantageous to construct the retrofocus type lens. But at the same time, it is disadvantageous to make variation in aberrations of the first lens group large because the focal length of the other lenses having the positive refractive power of the first lens group should be short.

It is possible to obtain a long back focus length at the wide angle position because it is easy to construct the retrofocus type lens at the wide angle position in the zoom lens composed of the first lens group having the negative refractive power, the second lens group having the positive refractive power, and the third lens group having the negative refractive power toward the object. On the other hand, it is disadvantageous to make the entire length of the optical system long because it is difficult to construct the telephoto lens type system at the telephoto position.

SUMMARY OF THE INVENTION

The present invention overcomes the problems and disadvantages of the prior art by providing a compact zoom lens system which uses a first lens group having a meniscus lens concave toward an object and two lenses having a positive refractive power toward the object, and a third lens group having a short negative focal length in the zoom lens composed of a first lens group having a positive refractive power, a second lens group having a negative refractive power, and a third lens group having a positive refractive power.

To achieve the objects and in accordance with the purpose of the invention, as embodied and broadly described herein, the wide-angle zoom lens system comprises a first lens group having a positive refractive power, a second lens group, and a third lens group having a negative refractive power. The distances between the first lens group, the second lens group, and the third lens group change during zooming. The first lens group includes a first lens having a negative refractive power with a shape of a meniscus lens concave toward an object and a second lens having a positive refractive power and a convex shape toward an image plane. The second lens group includes a first lens subgroup having a positive refractive power, and a second lens subgroup having a positive refractive power.

The wide-angle zoom lens system according to the above-mentioned construction satisfies following conditions.

[condition 1] $0.2 < f_w/f_1 < 0.6$

[condition 2] $1.1 < f_w/f_{12w} < 1.9$ wherein:

$f_w$: combined focal length at the widest angle position of the wide-angle zoom lens $f_1$: focal length of the first lens group $f_{12w}$: combined focal length of the first lens group and the second lens group at the wide-angle

[condition 3] $1.5<(1/f_{2a}vd_{2a}+1/f_{2b}vd_{2b}+1/f_{2c}vd_{2c}+1/f_{2d}vd_{2d})\times f_2 \times f_w<2.8$ where $f_{2a}$, $f_{2b}$, $f_{2c}$, $f_{2d}$ represent focal lengths of the 2a, 2b, 2c, 2d lenses in the second lens group II, respectively, and $vd_{2a}$, $vd_{2b}$, $vd_{2c}$, $vd_{2d}$ represent Abbe numbers of the 2a, 2b, 2c, 2d lenses in the second group II, respectively.

$F_2$: focal length of the second lens group II.

According to another aspect of the present invention, the wide-angle zoom lens system comprises a first lens group and a second lens group having a positive refractive power, and a third lens group having a negative refractive power. The distances between the first lens group, the second lens group, and the third lens group change during zooming. The first lens group includes a first lens having a negative refractive power with a shape of a meniscus lens concave toward an object, a second lens having a positive refractive power and a third lens having a negative refractive power. The first, second and third lens groups are made of spherical lenses. The distance between the first and second lens groups is increased and the distance between the second and third lens groups is reduced.

The wide-angle zoom lens system according to the above-mentioned construction satisfies following condition.

[condition 4] $-5.0<(R_{1a1}+R_{1a2})/(R_{1a1}-R_{1a2})<-3.5$ wherein:

$R_{1a1}$: curvature radius toward the object of a lens 1a in the first lens group $R_{1a2}$: curvature radius toward the image plane of the lens 1a in the first lens group In addition, the wide-angle zoom lens system according to the above-mentioned construction further satisfies following condition.

[condition 5] $0.0<(R_{1b1}+R_{1b2})/(R_{1b1}-R_{1b2})<2.0$ wherein:

$R_{1b1}$: curvature radius toward the object of a lens 1b in the first lens group $R_{1b2}$: curvature radius toward the image plane of lens 1b in the first lens group In addition, the wide-angle zoom lens system according to the above-mentioned construction further satisfies following condition.

[condition 6] $-6.0<(R_{2d1}+R_{2d2})/(R_{2d1}-R_{2d2})<-2.5$ wherein:

$R_{2d1}$: curvature radius toward the object of a lens 2d in the second lens group $R_{2d2}$: curvature radius toward the image plane of lens 2d in the first lens group In addition, the wide-angle zoom lens system according to the above-mentioned construction further satisfies following condition.

[condition 7] $9.0<(t_{2c}+t_{2d})<12.5$ wherein:

$t_{2c}$: thickness on an optical axis of a lens 2c in the second lens group $t_{2d}$: thickness on the optical axis of a lens 2d in the second lens group In addition, the wide-angle zoom lens system according to the above-mentioned construction further satisfies following conditions.

[condition 8] $-0.20<f_3/f_T<-0.12$
[condition 9] $1.05<(L_T/f_T)<1.20$ wherein:

$L_T$: distance on the optical axis from the object side surface to the image plane of lens 1a in the first lens group at a telephoto position of the wide-angle zoom lens $f_T$: combined focal length at the telephoto position of the wide-angle zoom lens $f_3$: focal length of the third lens group.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE PREFERRED EMBODIMENTS

Reference will now be made in detail to preferred embodiments of the present invention, examples of which are illustrated in the accompanying drawings. Wherever possible, the same reference numbers will be used throughout the drawings to refer to the same or like parts.

Figure 1:
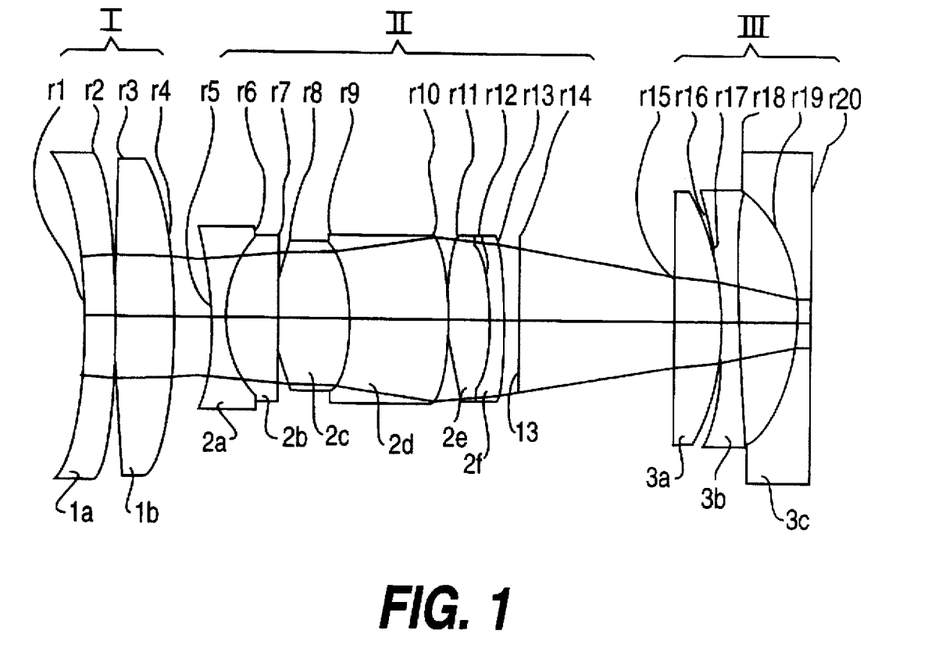
FIG. 1 is a sectional view of a wide-angle zoom lens at a wide angle position according to a preferred embodiment of the present invention.
Figure 2:
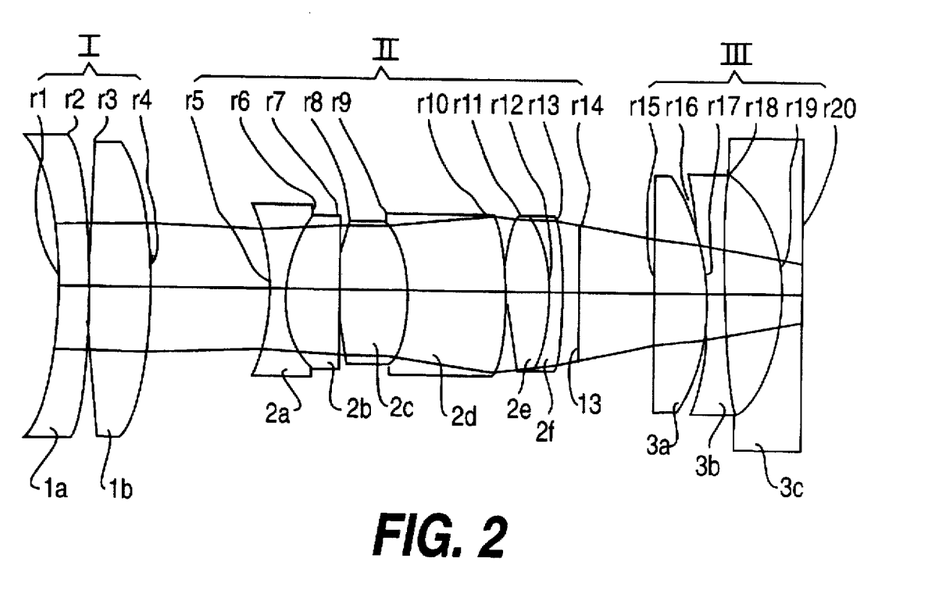
FIG. 2 is a sectional view of a wide-angle zoom lens at a middle position according to a preferred embodiment of the present invention.
Figure 3:
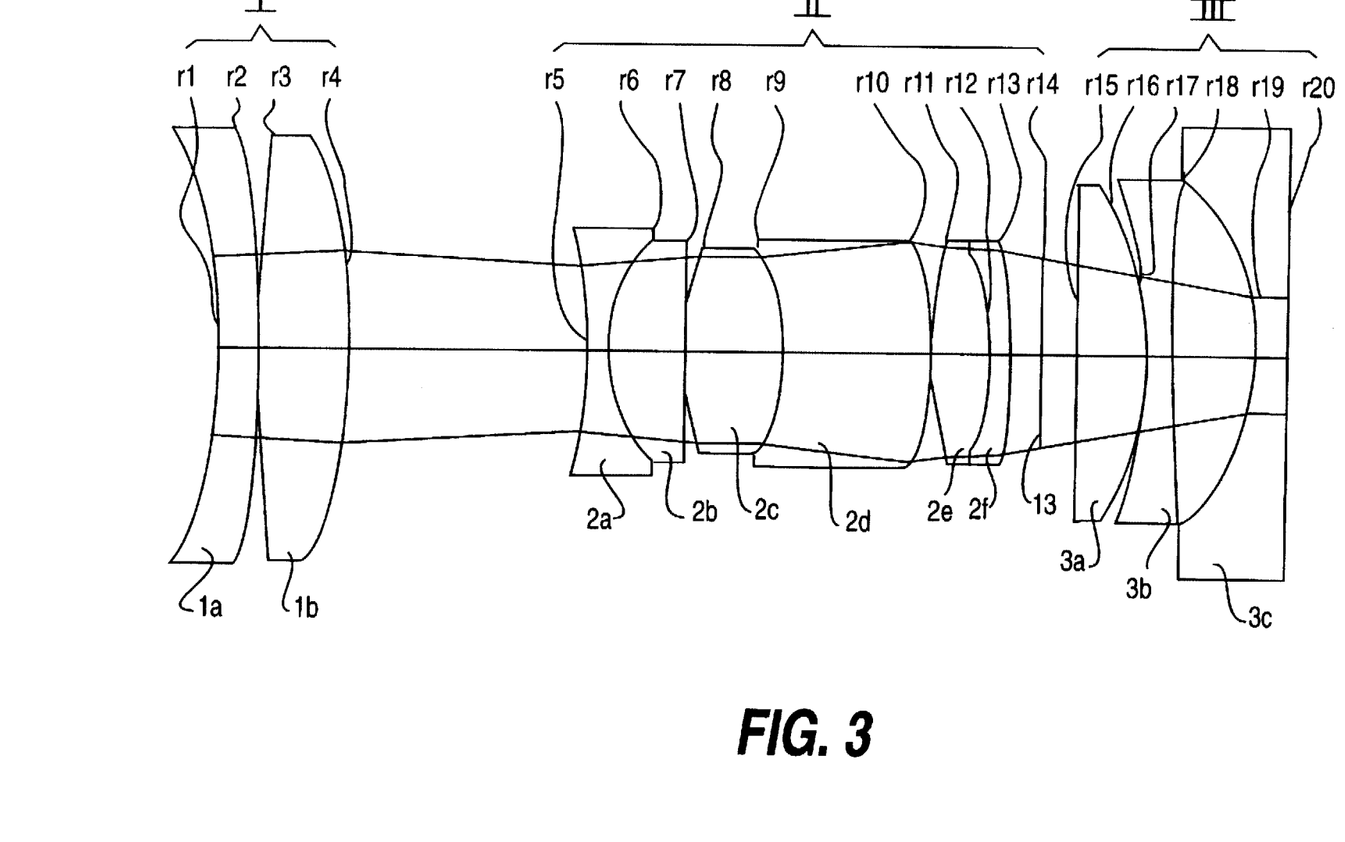
FIG. 3 is a sectional view of a wide-angle zoom lens at a telephoto position according to a preferred embodiment of the present invention.
Figure 4:
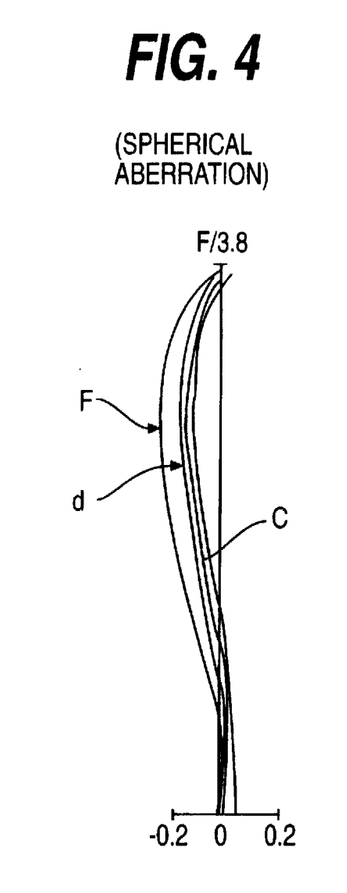
FIG. 4 shows the extent of spherical aberration associated with the zoom lens at a wide angle position according to a first preferred embodiment of the present invention.
Figure 5:
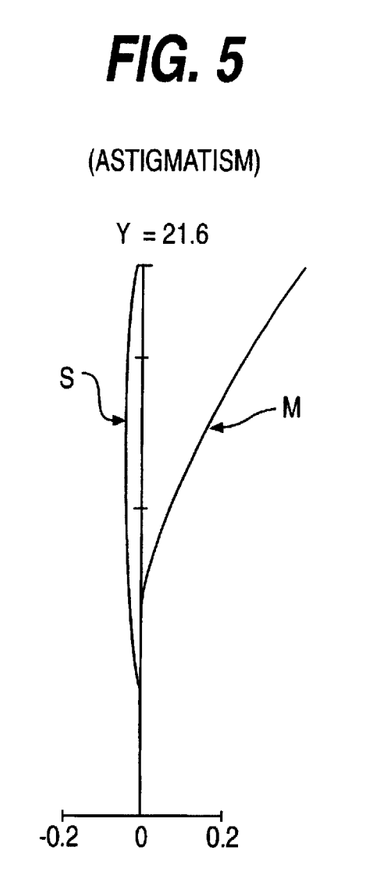
FIG. 5 shows the extent of astigmatism associated with the zoom lens at a wide angle position according to a first preferred embodiment of the present invention.
Figure 6:
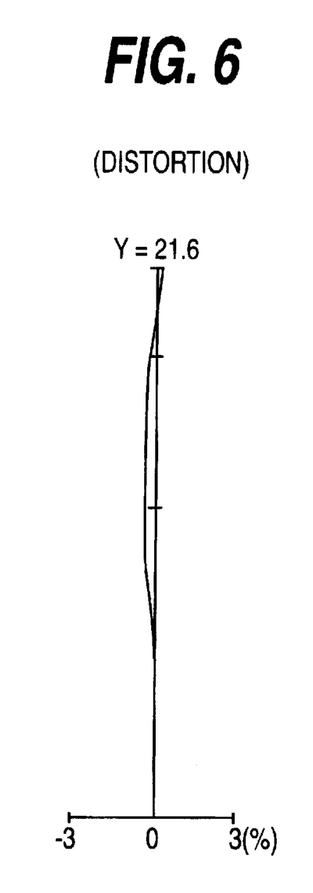
FIG. 6 shows the extent of distortion associated with the zoom lens at a wide angle position according to a first preferred embodiment of the present invention.
Figure 7:
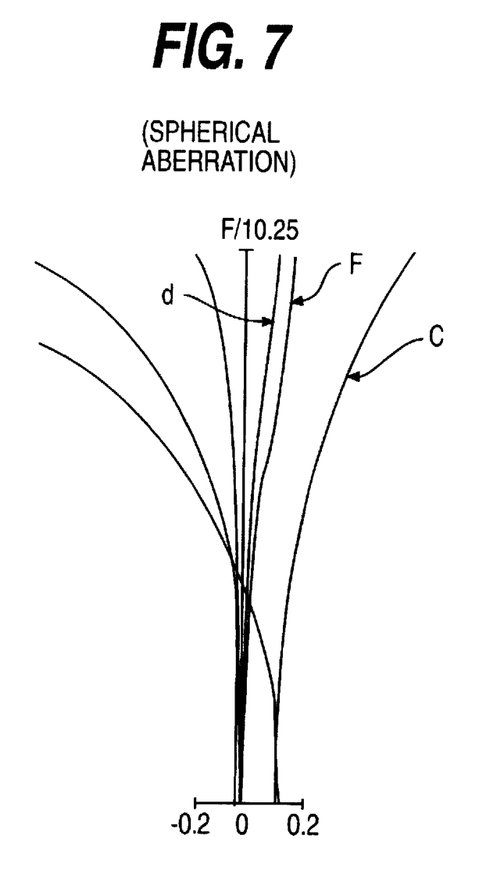
FIG. 7 shows the extent of spherical aberration associated with the zoom lens at a telephoto position according to a first preferred embodiment of the present invention.
Figure 8:
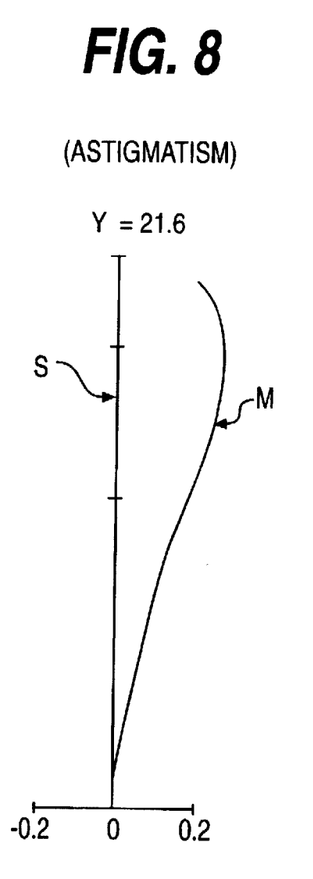
FIG. 8 shows the extent of astigmatism associated with the zoom lens at a telephoto position according to a first preferred embodiment of the present invention.
Figure 9:
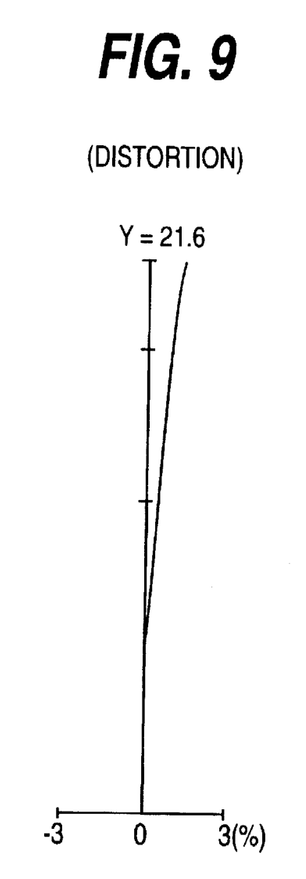
FIG. 9 shows the extent of distortion associated with the zoom lens at a telephoto position according to a first preferred embodiment of the present invention.
Figure 10:
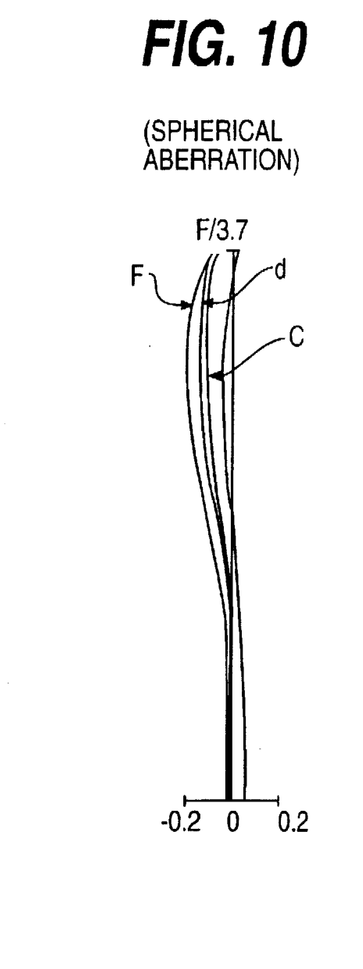
FIG. 10 shows the extent of spherical aberration associated with the zoom lens at a wide angle position according to a second preferred embodiment of the present invention.
Figure 11:
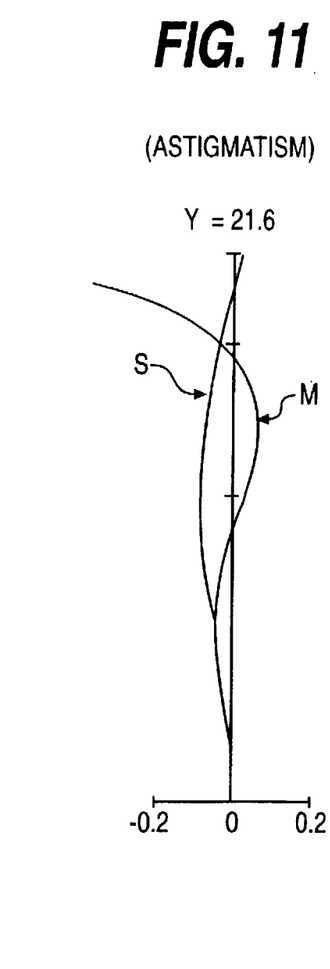
FIG. 11 shows the extent of astigmatism associated with the zoom lens at a wide angle position according to a second preferred embodiment of the present invention.
Figure 12:
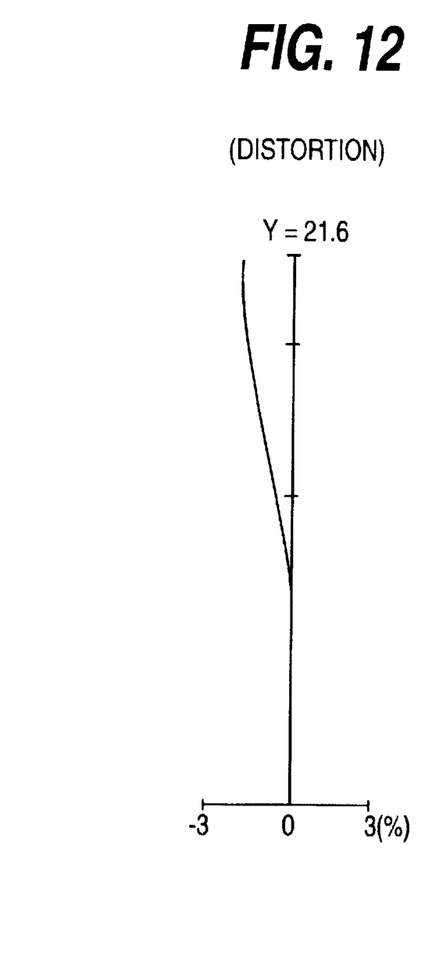
FIG. 12 shows the extent of distortion associated with the zoom lens at a wide angle position according to a second preferred embodiment of the present invention.
Figure 13:
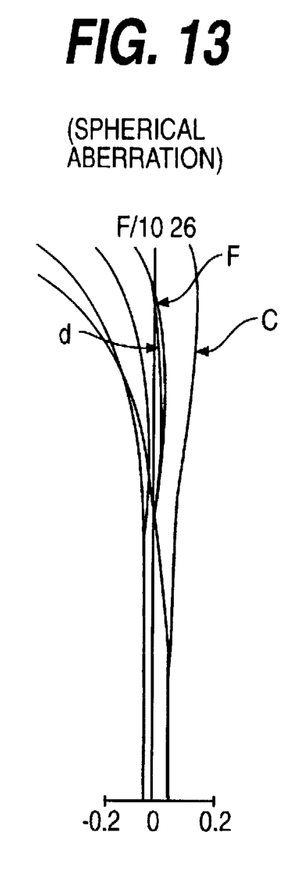
FIG. 13 shows the extent of spherical aberration associated with the zoom lens at a telephoto position according to a second preferred embodiment of the present invention.
Figure 14:
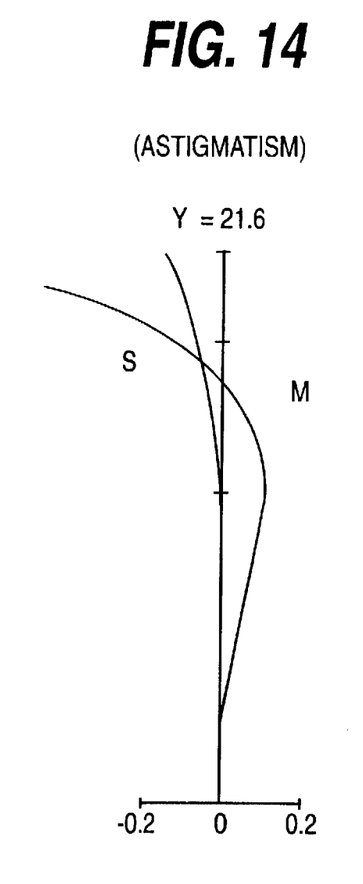
FIG. 14 shows the extent of astigmatism associated with the zoom lens at a telephoto position according to a second preferred embodiment of the present invention.
Figure 15:
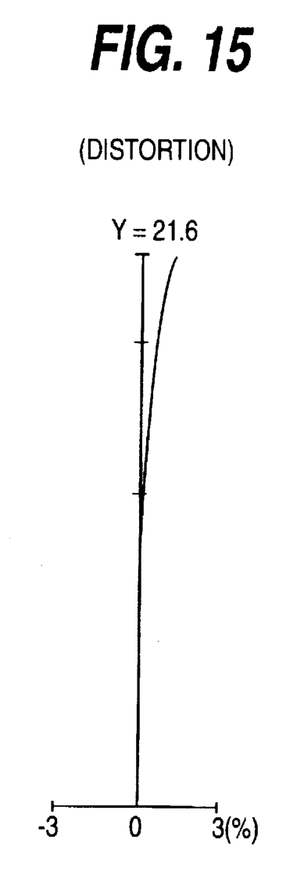
FIG. 15 shows the extent of distortion associated with the zoom lens at a telephoto position according to a second preferred embodiment of the present invention.
Figure 16:
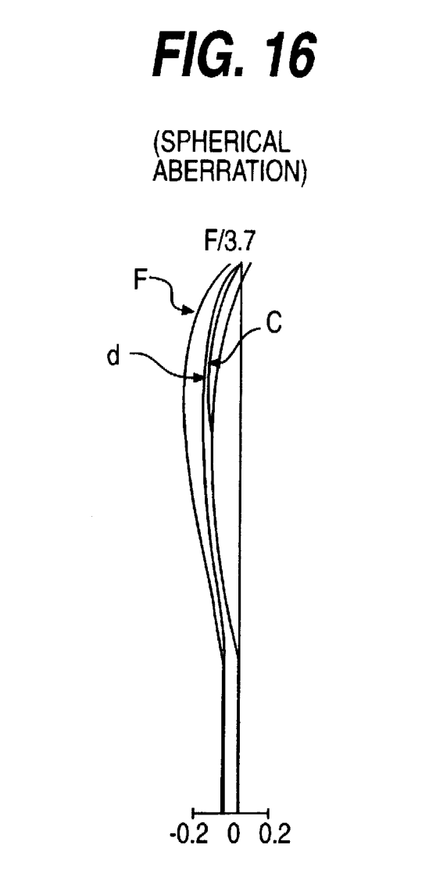
FIG. 16 shows the extent of spherical aberration associated with the zoom lens at a wide angle position according to a third preferred embodiment of the present invention.
Figure 17:
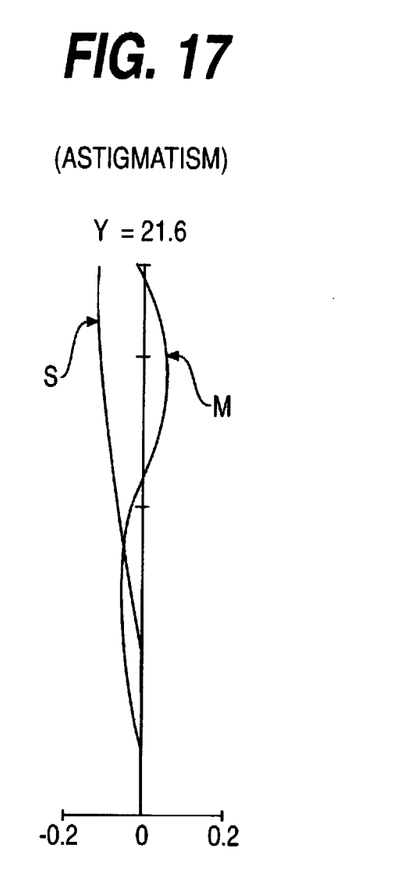
FIG. 17 shows the extent of astigmatism associated with the zoom lens at a wide angle position according to a third preferred embodiment of the present invention.
Figure 18:
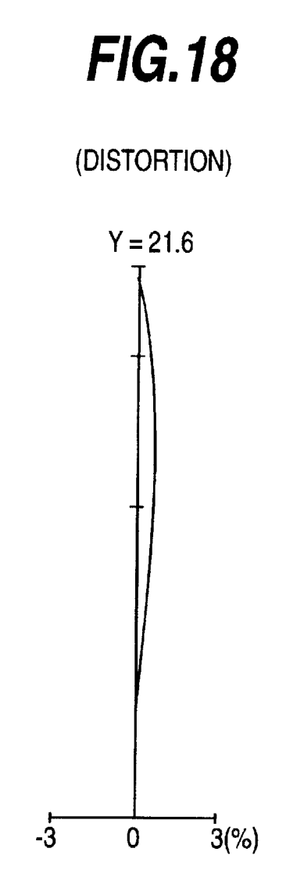
FIG. 18 shows the extent of distortion associated with the zoom lens at a wide angle position according to a third preferred embodiment of the present invention.
Figure 19:
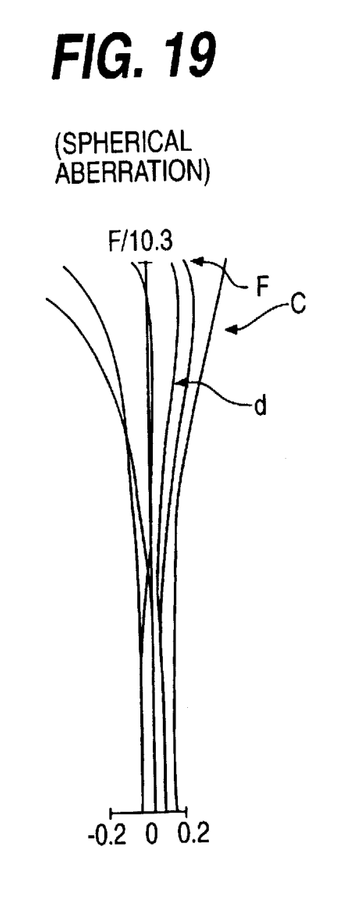
FIG. 19 shows the extent of spherical aberration associated with the zoom lens at a telephoto position according to a third preferred embodiment of the present invention.
Figure 20:
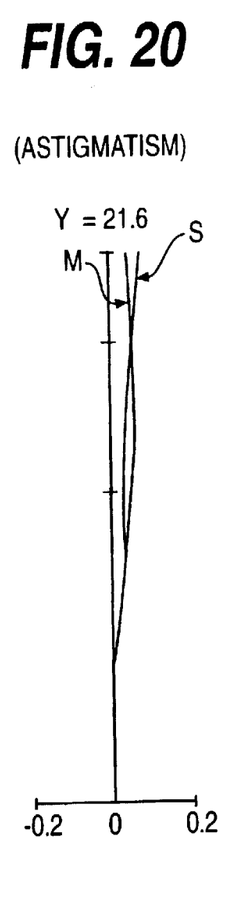
FIG. 20 shows the extent of astigmatism associated with the zoom lens at a telephoto position according to a third preferred embodiment of the present invention.
Figure 21:
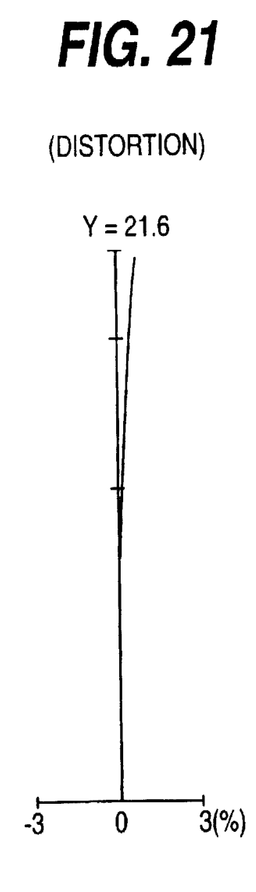
FIG. 21 shows the extent of distortion associated with the zoom lens at a telephoto position according to a third preferred embodiment of the present invention.
Figure 22:
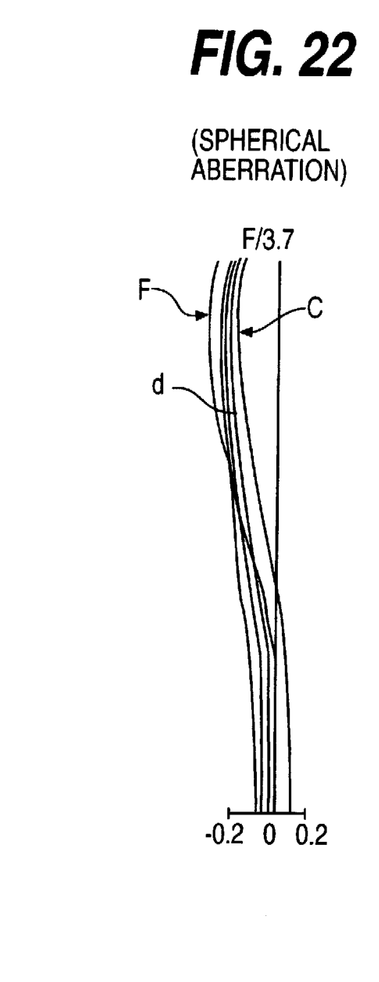
FIG. 22 shows the extent of spherical aberration associated with the zoom lens at a wide angle position according to a fourth preferred embodiment of the present invention.
Figure 23:
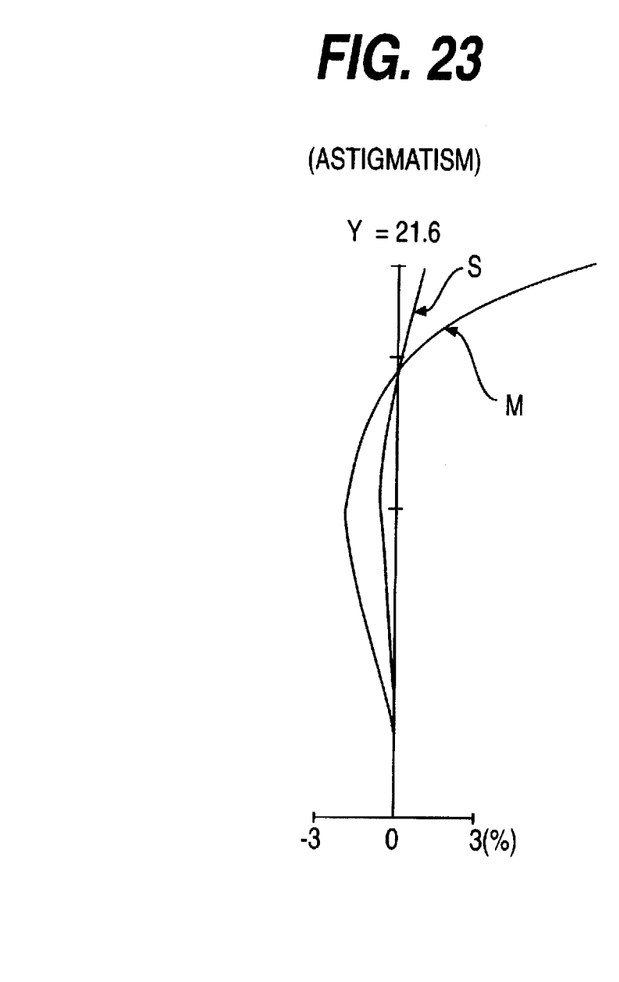
FIG. 23 shows the extent of astigmatism associated with the zoom lens at a wide angle position according to a fourth preferred embodiment of the present invention.
Figure 24:
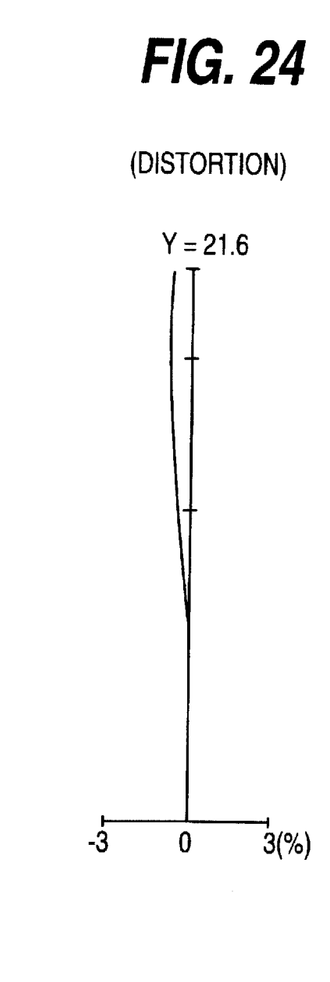
FIG. 24 shows the extent of distortion associated with the zoom lens at a wide angle position according to a fourth preferred embodiment of the present invention.
Figure 25:
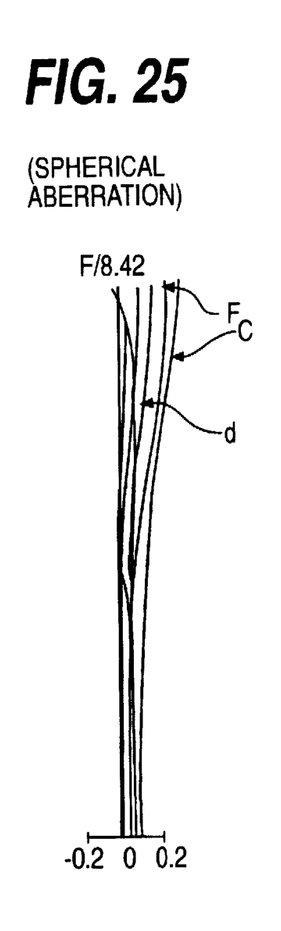
FIG. 25 shows the extent of spherical aberration associated with the zoom lens at a telephoto position according to a fourth preferred embodiment of the present invention.
Figure 26:
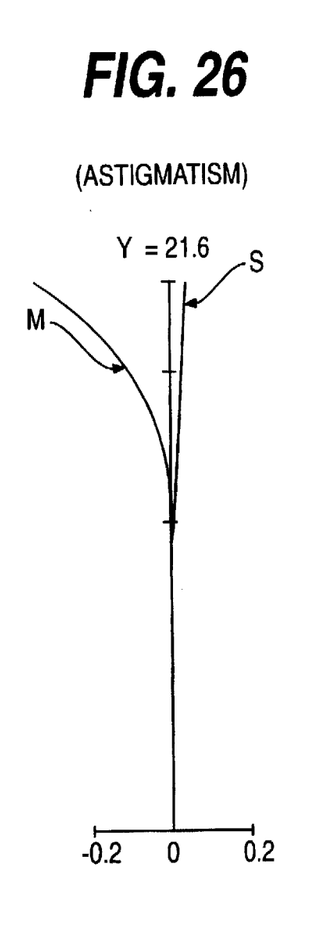
FIG. 26 shows the extent of astigmatism associated with the zoom lens at a telephoto position according to a fourth preferred embodiment of the present invention.
Figure 27:
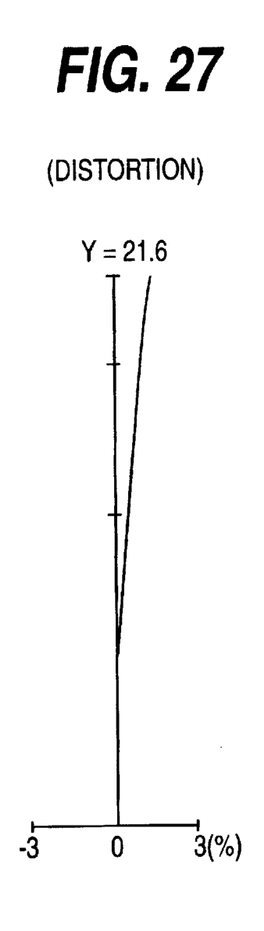
FIG. 27 shows the extent of distortion associated with the zoom lens at a telephoto position according to a fourth preferred embodiment of the present invention.

A wide-angle zoom lens system according to a preferred embodiment of the present invention includes a first lens group I, a second lens group II, and a third lens group III which are arranged in order toward an object and spaced from each other by predetermined distances.

The wide-angle zoom lens system according to a preferred embodiment of the present invention includes a first lens group I having a positive refractive power, a second lens group II having a positive refractive power and a third lens group III having a negative refractive power. The first lens group I includes a lens 1a having a negative refractive power with a shape of a meniscus lens concave toward an object and a lens 1b having a positive refractive power and a convex plane toward an image plane. The second lens group II includes a lens 2a with two concave sides, a lens 2b having a positive refractive power and cemented to lens 2a, a lens 2c with two convex sides, a lens 2d having a negative refractive power with a shape of a meniscus lens and cemented to lens 2c, a lens 2e having a positive refractive power, and a lens 2f having a negative refractive power. The third lens group III includes a lens 3a having a positive refractive power, a lens 3b having a negative refractive power and concave toward the object, and a lens 3c having a negative refractive power and concave toward the object. A diaphragm 13 is mounted between the second lens group II and the third lens group III.

According to another embodiment of the present invention, the distance between the first lens group I and the second lens group II is increased and the distance between the second lens group II and the third lens group III is reduced to increase the overall focal length of the lens. Thus, variations in magnification from a wide angle position to a telephoto position are performed while the first lens group I, the second lens group II, and the third lens group III move toward an object.

The operation of the above-mentioned conditions will be described hereinafter in detail.

Condition 1 relates to a combined lateral magnification of the second lens group II and the third lens group III at the widest angle position for obtaining a zoom ratio of high magnification while maintaining good aberration performance.

If the focal length ratio in condition 1 exceeds the upper limit, the length at the optical axis of the overall optical system (the whole field of the lens) at the widest angle position becomes short, but the aberration becomes large because the back focus distance is shortened and light passing through the second lens group II passes through a higher or lower position than the optical axis of the third lens group III. In addition, curvature of an image plane becomes large and chromatic aberration occurs because Petzval's Sum for concurrently compensating astigmatism of the lens and curvature of image is excessively compensated.

If the ratio of focal lengths in condition 1 falls below the lower limit, it is easy to compensate the aberration, but the length at the optical axis of the overall optical system at the wide-angle position becomes too large to attain compactness.

Condition 2 relates to a combined focal length of the first lens group I and the second lens group II. If condition 1 is satisfied, the focal length of the second lens group is determined by condition 2 to make the overall optical system compact at the wide angle position.

If the ratio of focal lengths in condition 2 exceeds the upper limit, the length at the optical axis of the overall optical system (the whole field of the lens) becomes short, but the curvature of the image plane becomes large and chromatic aberration occurs because Petzval's Sum is excessively compensated.

If the ratio of focal lengths in condition 2 falls below the lower limit of the range, it is easy to compensate aberrations, but the overall back focus distance of the optical system becomes long and an outer diameter of the third lens group III becomes large because the length at the optical axis of the overall optical system becomes large and the focal length of the third lens group III becomes long.

Condition 3 relates to compensating aberrations which occur around the image plane. In particular, the chromatic aberrations when the distance between the second lens group II and the third lens group III increases at the wide angle position in the zoom lens composed of the first lens group having the positive refractive power, the second lens group having the negative refractive power, and the third lens group having the positive refractive power toward the object.

If a value exceeds the upper limit or falls below the lower limit in condition 3, spreading of color is caused even when photographing is carried out by tightening a diaphragm because generic aberrations, like the magnification in chromatic aberrations, are caused beyond the optical axis on the image plane at the wide angle position and it is difficult to compensate the chromatic aberrations for color wavelengths, that is, C-line and e-line among the chromatic aberrations.

Condition 4 relates to a shape factor which defines the shape of lens 1a. If a value exceeds the upper limit in condition 4, the refractive power of lens 1a becomes strong, thereby making compensation for aberrations difficult, and if the value falls below the lower limit in condition 4, the refractive power of the lath lens becomes weak, thereby making obtaining the sufficient back focal length difficult.

Condition 5 relates to defining the shape of the 1bth lens. If a value exceeds the upper limit in condition 5, the curvature radius of lens 1b becomes small, thereby causing higher degree aberrations. In addition, if the value falls below the lower limit in condition 5, the curvature radius of the 1bth lens becomes large, thereby making compensation for aberrations difficult and the focal length of the first lens group I becomes long, making obtaining the compact camera difficult.

Condition 6 relates to defining the shape of lens 2d. If a value exceeds the upper limit in condition 6, the chromatic aberrations are excessively compensated, thereby making remaining chromatic aberrations big. In addition, if the value falls below the lower limit in condition 6, the curvature radius of the lens toward the object becomes small and the refractive power of lens 2d becomes weak, thereby causing the higher degree aberrations and making the compensation for chromatic aberrations difficult.

Lenses 2c and 2d are cemented lenses and compensate the chromatic aberrations, and on the other hand, compensate the curvature of image by constructing a concentric field.

Accordingly, if a value exceeds the upper limit in condition 7, the thickness of the second lens group II becomes large, thereby making obtaining the compact camera difficult and light amount around the object reduced. In addition, if the value falls below the lower limit in condition 7, it is difficult to construct the concentric field, thereby making the compensation for the curvature of image difficult.

Conditions 8 and 9 relate to making a compact lens system. If a value exceeds the upper limit in conditions 8 and 9, the refractive power of the third lens group III becomes strong and it is advantageous to make the compact lens system, but it is difficult to compensate the higher degree aberrations occurred as the curvature radius of the lens surface becomes small. In addition, if the value falls below the lower limit in conditions 8 and 9, it is difficult to make the compact lens system for the curvature of image difficult.

Tables 1, 2, 3, and 4 show values for first, second, third, and fourth embodiments of the present invention. Optical characteristics of the first, second, third, and fourth embodiments are shown in FIGS. 4–27.

In the following tables, f is the focal length, ri (i=1 to 20) is the radius of curvature of refractive plane i, di (i=1 to 20) is a thickness of the lens or a distance between lenses, N is a refractive index of d-line of the lens, vd is an ABBE number of the lens, m is a magnification of the overall lens system and w is a half view angle. Unlabled distances are in mm.

The values satisfying the above-mentioned conditions according to the first preferred embodiment of the present invention is provided in Table 1, where an F number, namely, brightness, $F_{no}$ is 3.8 to 10.25, the focal length, f is 29.012 mm to 86.971 mm, a half view angle, w is 36.61° to 13.8°, and a back focus distance, $f_B$ is 8.5 mm to 54.076 mm.

TABLE 1

| surface number | r | d | N | vd |
|---|---|---|---|---|
| 1 | −26.814 | 1.80 | 1.84666 | 23.78 |
| 2 | −45.966 | 0.10 | | |
| 3 | 247.331 | 3.50 | 1.62041 | 60.34 |
| 4 | −30.106 | 2.4 to 10.35 | | |
| 5 | −18.046 | 0.85 | 1.78590 | 43.93 |
| 6 | 7.977 | 3.29 | 1.72825 | 28.32 |
| 7 | −119.902 | 0.10 | | |
| 8 | 20.655 | 4.37 | 1.51680 | 64.20 |
| 9 | −8.976 | 6.40 | 1.83400 | 37.34 |
| 10 | −13.847 | 0.10 | | |
| 11 | 34.184 | 2.50 | 1.51680 | 64.20 |
| 12 | −12.808 | 0.80 | 1.84666 | 23.78 |
| 13 | −33.350 | 1.20 | | |
| 14 | ∞ | 9.50 to 1.56 | | |
| 15 | 387.524 | 3.05 | 1.75520 | 27.53 |
| 16 | −16.752 | 0.10 | | |
| 17 | −23.738 | 1.00 | 1.77250 | 49.62 |
| 18 | 92.829 | 3.65 | | |
| 19 | −11.093 | 1.20 | 1.75700 | 47.71 |
| 20 | −382.204 | | | |

The values of conditions disclosed in conditions 1 to 9 according to the first preferred embodiment are:

[condition 1] $f_w/f_1=1.486$

[condition 2] $f_w/f_{12w}=0.340$

[condition 3]

$$\left[\sum_{i=1}^{4} \frac{1}{(f_{2i} \times vd_{2i})}\right] \times f_2 \times f_w = 2.535$$

[condition 4] $(R_{1a1}+R_{1a2})/(R_{1a1}-R_{1a2})=-3.800$

[condition 5] $(R_{1b1}+R_{1b2})/(R_{1b1}-R_{1b2})=0.783$

[condition 6] $(R_{2d1}+R_{2d2})/(R_{2d1}-R_{2d2})=-4.685$

[condition 7] $(t_{2c}+t_{2d})=10.770$

[condition 8] $f_3/f_T=-0.201$

[condition 9] $L_T/f_T=1.150$

Optical characteristics of the first preferred embodiment are shown in FIGS. 4–9.

The values satisfying the above-mentioned conditions according to the second preferred embodiment of the present invention is provided in Table 2, where an F number, namely, brightness, $F_{no}$ is 3.7 to 10.26, the focal length, f is 29.019 mm to 86.513 mm, a half view angle, w is 37.08° to 13.91°, and a back focus distance, $f_B$ is 8.483 mm to 56.38 mm.

TABLE 2

| surface number | r | d | N | vd |
|---|---|---|---|---|
| 1 | −26.220 | 1.15 | 1.84666 | 23.78 |
| 2 | −63.280 | 0.10 | | |
| 3 | 173.961 | 3.40 | 1.58913 | 61.25 |
| 4 | −26.734 | 2.89 to 8.63 | | |
| 5 | −15.939 | 0.85 | 1.80420 | 46.50 |
| 6 | 9.301 | 3.08 | 1.72825 | 28.32 |
| 7 | −56.868 | 0.37 | | |
| 8 | 21.385 | 3.86 | 1.51823 | 58.96 |
| 9 | −7.731 | 6.10 | 1.78590 | 43.93 |
| 10 | −12.206 | 0.10 | | |
| 11 | 32.850 | 2.80 | 1.51680 | 64.20 |

TABLE 2-continued

| surface number | r | d | N | vd |
|---|---|---|---|---|
| 12 | −11.482 | 0.80 | 1.84666 | 23.78 |
| 13 | −34.500 | 1.20 | | |
| 14 | ∞ | 9.07 to 1.57 | | |
| 15 | −82.495 | 2.90 | 1.80518 | 25.46 |
| 16 | −16.650 | 0.10 | | |
| 17 | −22.913 | 1.00 | 1.62299 | 58.12 |
| 18 | 62.210 | 3.89 | | |
| 19 | −10.996 | 1.20 | 1.75700 | 47.71 |
| 20 | −89.150 | | | |

The values of conditions disclosed in conditions 1 to 9 according to the second preferred embodiment are:

[condition 1] $f_w/f_1=1.535$

[condition 2] $f_w/f_{12w}=0.323$

[condition 3]

$$\left[\sum_{i=1}^{4} \frac{1}{(f_{2i} \times vd_{2i})}\right] \times f_2 \times f_w = 2.435$$

[condition 4] $(R_{1a1}+R_{1a2})/(R_{1a1}-R_{1a2})=-2.716$

[condition 5] $(R_{1b1}+R_{1b2})/(R_{1b1}-R_{1b2})=0.734$

[condition 6] $(R_{2d1}+R_{2d2})/(R_{2d1}-R_{2d2})=-4.455$

[condition 7] $(t_{2c}+t_{2d})=9.960$

[condition 8] $f_3/f_T=-0.199$

[condition 9] $L_T/f_T=1.160$

Optical characteristics of the second preferred embodiment are shown in FIGS. 10–15.

The values satisfying the above-mentioned conditions according to the third preferred embodiment of the present invention is provided in Table 3, where an F number, namely, brightness, $F_{no}$ is 3.7 to 10.3, the focal length, f is 28.998 mm to 86.868 mm, a half view angle, w is 36.72° to 13.85°, and a back focus distance, $f_B$ is 8.491 mm to 53.477 mm.

TABLE 3

| surface number | r | d | N | vd |
|---|---|---|---|---|
| 1 | −27.696 | 1.80 | 1.80518 | 25.46 |
| 2 | −42.929 | 0.10 | | |
| 3 | 196.461 | 2.22 | 1.63854 | 55.45 |
| 4 | −30.051 | 2.40 to 8.69 | | |
| 5 | −18.799 | 0.85 | 1.83400 | 37.34 |
| 6 | 8.349 | 4.55 | 1.72825 | 28.32 |
| 7 | −44.166 | 0.10 | | |
| 8 | 20.127 | 5.39 | 1.51823 | 58.96 |
| 9 | −9.729 | 6.00 | 1.83400 | 37.34 |
| 10 | −14.594 | 0.10 | | |
| 11 | 43.443 | 2.50 | 1.51680 | 64.20 |
| 12 | −13.099 | 0.80 | 1.84666 | 23.78 |
| 13 | −29.593 | 1.20 | | |
| 14 | ∞ | 7.85 to 1.56 | | |
| 15 | 94.437 | 2.94 | 1.72825 | 28.32 |
| 16 | −16.503 | 0.10 | | |
| 17 | −22.748 | 1.00 | 1.77250 | 49.62 |
| 18 | 32.976 | 4.36 | | |
| 19 | −9.169 | 1.20 | 1.75700 | 47.71 |
| 20 | −37.885 | | | |

The values of conditions disclosed in conditions 1 to 9 according to the second preferred embodiment are:

[condition 1] $f_w/f_1=1.611$

[condition 2] $f_w/f_{12w}=0.265$

[condition 3]

$$\left[\sum_{i=1}^{4} \frac{1}{(f_{2i} \times vd_{2i})}\right] \times f_2 \times f_w = 2.308$$

[condition 4] $(R_{1a1}+R_{1a2})/(R_{1a1}-R_{1a2})=-4.636$

[condition 5] $(R_{1b1}+R_{1b2})/(R_{1b1}-R_{1b2})=1.361$

[condition 6] $(R_{2d1}+R_{2d2})/(R_{2d1}-R_{2d2})=-5.000$

[condition 7] $(t_{2c}+t_{2d})=11.390$

[condition 8] $f_3/f_T=-0.175$

[condition 9] $L_T/f_T=1.139$

Optical characteristics of the third preferred embodiment are shown in FIGS. 16–21.

The values satisfying the above-mentioned conditions according to the fourth preferred embodiment of the present invention is provided in Table 4, where an F number, namely, brightness, $F_{no}$ is 3.7 to 8.48, the focal length, f is 29.003 mm to 77.963 mm, a half view angle, w is 36.87° to 15.28°, and a back focus distance, $f_B$ is 8.499 mm to 46.963 mm.

TABLE 4

| surface number | r | d | N | vd |
|---|---|---|---|---|
| 1 | −31.681 | 1.80 | 1.84666 | 23.78 |
| 2 | −68.852 | 0.10 | | |
| 3 | 69.639 | 3.50 | 1.75700 | 47.71 |
| 4 | −43.292 | 2.4 to 10.35 | | |
| 5 | −21.561 | 0.85 | 1.78590 | 43.93 |
| 6 | 8.773 | 3.29 | 1.72825 | 28.32 |
| 7 | −165.519 | 0.10 | | |
| 8 | 32.654 | 4.37 | 1.62041 | 60.34 |
| 9 | −8.704 | 6.40 | 1.84666 | 23.78 |
| 10 | −18.373 | 0.10 | | |
| 11 | 94.705 | 2.50 | 1.51680 | 64.20 |
| 12 | −30.264 | 0.80 | | |
| 13 | ∞ | 9.93 to 1.56 | | |
| 14 | −71.261 | 2.99 | 1.64769 | 33.84 |
| 15 | −14.261 | 0.10 | | |
| 16 | −18.832 | 1.00 | 1.60311 | 60.69 |
| 17 | −102.715 | 2.97 | | |
| 18 | −11.668 | 1.20 | 1.74330 | 49.22 |
| 19 | 753.326 | | | |

The values of conditions disclosed in conditions 1 to 9 according to the third preferred embodiment of the present invention are as follows:

[condition 1] $f_w/f_1=1.462$

[condition 2] $f_w/f_{12w}=0.439$

[condition 3]

$$\left[\sum_{i=1}^{4} \frac{1}{(f_{2i} \times vd_{2i})}\right] \times f_2 \times f_w = 2.308$$

[condition 4] $(R_{1a1}+R_{1a2})/(R_{1a1}-R_{1a2})=-2.706$

[condition 5] $(R_{1b1}+R_{1b2})/(R_{1b1}-R_{1b2})=0.233$

[condition 6] $(R_{2d1}+R_{2d2})/(R_{2d1}-R_{2d2})=-2.800$

[condition 7] $(t_{2c}+t_{2d})=10.770$

[condition 8] $f_3/f_T=-0.243$

[condition 9] $L_T/f_T=1.189$

Optical characteristics of the fourth preferred embodiment are shown in FIGS. 22–27.

As described the above, in the preferred embodiment of the present invention, there is provided the wide-angle zoom lens system which can reduce variation in aberrations and obtain a sufficient back focus distance at the wide angle position by making the view angle wide at the wide angle position and making the whole length of the optical system short at the telephoto position. The first lens group includes the negative refractive power with the shape of the meniscus lens concave toward an object and the lens having the positive refractive power in the zoom lens composed of the first lens group having the positive refractive power. The second lens group has the negative refractive power, and the third lens group has the positive refractive power toward an object. The zoom lens can compensate for aberrations beyond the optical axis, in particular, generic aberrations like the magnification in chromatic aberrations by assembling lenses and adjusting the focal length of each lens properly in the second lens group.

Other embodiments of the invention will be apparent to those skilled in the art from consideration of the specification and practice of the invention disclosed herein. It is intended that the specification and examples can be considered as exemplary only, with a true scope and spirit of the invention being indicated by the following claims.

For example, the embodiments of this invention use a still picture 35 mm film format, while other lenses for different formats and applications may be made in accordance with this invention. Additionally, lenses according to this invention are not limited to lens shutter cameras, but may also be used with other cameras such as focal plane shutter cameras.

What is claimed is:

1. A zoom lens system comprising, in order from an object side of the zoom lens system toward an image plane:
   a first lens group having a positive refractive power, comprising:
      a first lens having a negative refractive power with a shape of a meniscus lens concave toward the object side; and
      a second lens having a positive refractive power and having a convex surface toward the image plane.
   a second lens group having a positive refractive power, comprising:
      a third lens of a bi-concave lens having a negative refractive power;
      a fourth lens, cemented to the third lens, having a positive refractive power;
      a fifth lens of a bi-convex lens;
      a sixth lens, cemented to a fifth lens, having a negative refractive power with a shape of a meniscus lens concave toward the object side;
      a seventh lens having a positive refractive power; and
      an eighth lens having a negative refractive power; and
   a third lens group having a negative refractive power,
   wherein a distance between the first lens group and the second lens group is increased and a distance between the second lens group and the third lens group is decreased during zooming from a wide angle position to a telephoto position, while the first, second and third lens groups shift toward the object side,
   and wherein the zoom lens system satisfies the following condition:

$$-6.0 < (R_9 + R_{10})/(R_9 - R_{10}) < -2.5,$$

where $R_9$ is a radius of curvature of a surface toward the object side of the sixth lens in the second lens group; and
   $R_{10}$ is a radius of curvature of a surface toward the image plane of the sixth lens in the second lens group.

2. The zoom lens system of claim 1, wherein all lenses of the first, second and third lens groups are spherical lenses.

3. The zoom lens system of claim 1, wherein the zoom lens system further satisfies the following condition:

$$9.0 < (t_9 + t_{10}) < 12.5,$$

wherein $t_9$ is a thickness on an optical axis of the fifth lens in the second lens group and
   $t_{10}$ is a thickness on the optical axis of the sixth lens in the second lens group.

4. A zoom lens system comprising, in order from an object side of the zoom lens system toward an image plane:
   a first lens group having a positive refractive power, comprising:
      a first lens having a negative refractive power with a shape of a meniscus lens concave toward the object side; and
      a second lens having a positive refractive power and having a convex surface toward the image plane;
   a second lens group having a positive refractive power; and
   a third lens group having a negative refractive power, comprising:
      a third lens having a positive refractive power and having a convex surface toward the image plane;
      a fourth lens having a negative refractive power and having a concave surface toward the object plane; and
      a fifth lens having a negative refractive power and having a concave surface toward the object side,
   wherein a distance between the first lens group and the second lens group is increased and a distance between the second lens group and the third lens group is decreased during zooming from a wide angle position to a telephoto position, while the first, second and third lens groups shift toward the object side,
   and wherein the zoom lens system satisfies the following conditions:

$$-0.20 < f_3/f_T < -0.12,$$

and $$1.05 < L_T/f_T < 1.20,$$

where $f_3$ is a focal length of the third lens group,
   $f_T$ is a combined focal length of the zoom lens system at the telephoto position, and
   $L_T$ is a distance on the optical axis from an object side surface of the first lens to the image plane at the telephoto position.

5. The zoom lens system of claim 4, wherein all lenses of the first, second and third lens groups are spherical lenses.

* * * * *